Patented Nov. 16, 1926.

1,606,767

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF SEPARATING HYDROGEN CYANIDE, AMMONIA, AND CARBON DIOXIDE FROM GAS MIXTURES CONTAINING THEM.

No Drawing. Application filed November 8, 1924, Serial No. 748,769, and in Germany November 26, 1923.

In certain manufacturing processes of producing hydrogen cyanide the gaseous hydrogen cyanide is obtained in association with ammonia, carbon dioxide and, as the case may be, one or more other gases. The separation of the hydrogen cyanide from the gas mixture has hitherto caused great difficulties and the results so far achieved, were very unsatisfactory.

The procedure consisted in extracting from the gas mixture first by means of sulfuric acid, the ammonia present, then subjecting the residual gas mixture containing carbon dioxide and the hydrogen cyanide, to a treatment with alcohol (comp. Germ. Pat. 104,953) or with water (comp. Ost. Lehrbuch der chemischen Technologie 11. edition page 184) whereby the hydrogen cyanide is withdrawn. The first method of using alcohol cannot be carried out on a large scale with success on account of economical reasons, whereas the second process yields the hydrogen cyanide in very dilute aqueous solutions only, which, in addition, contain not inconsiderable quantities of carbon dioxide. From these the hydrocyanic acid has to be expelled by warming, whereby the carbon dioxide is not wholly separated from the former, to be absorbed finally in alkali lye. This way of working necessitates a large plant and demands a considerable consumption of energy.

According to my present invention the problem of extracting the hydrogen cyanide from gaseous mixtures containing amongst other gases ammonia and carbon dioxide, is solved in an excellent way by treating in a suitable manner the gaseous mixture with such salts of bases preferably of the alkaline earths including magnesium, the carbonates of which are less soluble in water than the salts used. If, for instance, the gaseous mixture is passed through a suspension of gypsum in water, a mixture is formed which contains calcium carbonate, ammonium sulfate and, as the case may be, some gypsum not yet decomposed, whereas the hydrogen cyanide, contrary to all expectations, passes through practically undecomposed. This could be the less anticipated as, on account of the calcium carbonate present, one had to reckon with the decomposition or retention of considerable quantities of hydrogen cyanide. Other salts, also capable of forming difficultly soluble carbonates such as for example strontium sulfate, calcium chloride, magnesium chloride and the like act in a similar fashion as gypsum. In the place of water aqueous solutions of ammonium sulfate can be used for the preparation of the suspensions, or solutions respectively, of the said salts to be used for the treatment of the gaseous mixture, particularly such ammonium sulfate solutions for example which have been obtained by a previous treatment of such gaseous mixtures. In this way the ammonium sulfate is gradually concentrated in the solution.

If the ammonia and the carbon dioxide are present in the gas mixture to be treated in a stoichiometric relation as regards ammonium carbonate, the hydrogen cyanide escaping from the vessel, wherein the ammonia and the carbon dioxide have been absorbed, can be converted into alkali cyanide by absorption in caustic alkali solution without any further treatment. In the case of ammonia being present in excess of carbon dioxide it is advisable to make up the deficiency by adding carbon dioxide for example in the form of flue gases. Otherwise, the ammonia still present can be extracted subsequently from the escaping gaseous mixture. This can be done for instance by treating the gas mixture in the well known way with sulfuric acid. An excess of carbon dioxide in proportion to the ammonia can be counter-balanced by the addition of the lacking quantity of ammonia, if the deficiency is relatively small. An excess of carbon dioxide, however, is not only not injurious to the process but may under certain conditions, even be advantageous. Such gases are therefore worked up without any preliminary treatment in accordance with my present invention, the carbon dioxide coming off with the hydrogen cyanide being separated subsequently. This can be done by two methods; the first consists in adding to the caustic alkali solution intended for the absorption of the hydrogen cyanide such a quantity of lime as corresponds to the carbon dioxide still present in the gas mixture. Thereby, in addition to the readily soluble alkali cyanide, sparingly soluble calcium carbonate is formed.

The second way of obtaining a good result is the absorption of the gases by means of solutions which contain in addition to alkali metal sulfate or alkali metal carbonate, a quantity of slacked lime sufficient for the conversion of the alkali metal salts and for fixing the carbon dioxide present in the gases. An excess of slacked lime is often very advantageous in that the alkali metal sulphate or carbonate are then more completely transformed to the base and the gas absorption is consequently bettered. When a mixture of alkali sulfate and lime is used for the final absorption of hydrogen cyanide and its conversion into a cyanide of an alkali forming metal the calcium sulfate formed by the reaction can be used for preparing the suspension used for carrying through the main process of scrubbing the gaseous mixture containing hydrogen cyanide, ammonia and carbon dioxide. The absorption of the hydrogen cyanide coming off the main i. e. the first stage of the process according to my invention can be carried through by lime water alone or by other bases of the same group, with the provision that the conversion of the calcium cyanide formed is executed with alkali metal salts whereby insoluble or sparingly soluble alkaline earth salts are formed. Such salts are for example alkali metal sulfates or alkali metal carbonates. In those cases when the gas mixture contains carbon dioxide, in addition to hydrogen cyanide, the former is in the course of this process precipitated in the shape of insoluble calcium carbonate. The conversion of the calcium cyanide can be carried out in the way I have just been describing either in the presence of the calcium carbonate precipitate or after the separation of the cyanide solution from the precipitate.

When the gaseous mixture containing hydrogen cyanide, ammonia and carbon dioxide has passed the suspension for instance of gypsum in water or the aqueous solution of another salt forming insoluble or difficultly soluble carbonates the residual mixture consisting chiefly of ammonium sulfate and, for instance, calcium carbonate, may be made use of for the recovery of the ammonia. This may be achieved by heating the residual mixture, after the solution or suspension of the salts, the carbonates of which are less soluble in water than the original salts used, has been employed repeatedly or for a prolonged time and the contents of ammonium sulfate has been increased as far as feasible. The gaseous mixture which escapes on heating is composed mainly of ammonia and carbon dioxide. This mixture can advantageously be introduced into for instance the cyanizing process to which nitrogenous organic materials for instance vinasse may be subjected in order to produce hydrogen cyanide. The addition of ammonia has proved to be very beneficial, the yield of hydrogen cyanide being considerably increased thereby, whilst the presence of carbon dioxide which escapes in association with the ammonia on heating the residues from the absorption causes no injurious effect. After expelling the gases from the mixture as far as possible by heating the residue which consists of a salt sparingly soluble in water, in the example mentioned above for instance calcium sulfate, may serve again as absorption agent and can be re-introduced into the process of separating hydrogen cyanide from admixed ammonia and carbon dioxide, thus completing the cycle.

What I claim is:

1. In a process of manufacturing hydrogen cyanide the separation of the hydrogen cyanide from a gas mixture comprising ammonia and carbon dioxide which consists in treating the gas mixture with salts of bases the carbonates of which are less soluble than the salts used, in the presence of water.

2. In a process of manufacturing hydrogen cyanide the separation of the hydrogen cyanide from a gas mixture comprising ammonia and carbon dioxide which consists in treating the gas mixture with salts of alkaline earths, the carbonates of which are less soluble than the salts used, in the presence of water.

3. In a process of manufacturing hydrogen cyanide the separation of the hydrogen cyanide from a gas mixture comprising ammonia and carbon dioxide which consists in treating the gas mixture comprising ammonia and carbon dioxide with gypsum in the presence of water.

4. In a process of manufacturing hydrogen cyanide the separation of the hydrogen cyanide from a gas mixture comprising ammonia and carbon dioxide which consists in treating the gas mixture with salts of bases, the carbonates of which are less soluble than the salts used, in the presence of water, and passing the escaping hydrogen cyanide into caustic alkali solution.

5. In a process of manufacturing hydrogen cyanide the separation of the hydrogen cyanide from a gas mixture comprising ammonia and carbon dioxide which consists in treating the gas mixture with salts of bases, the carbonates of which are less soluble than the salts used, in the presence of water taking care that carbon dioxide is present in not less than stoichiometric proportions with respect to the ammonia present.

6. In a process of manufacturing hydrogen cyanide the separation of the hydrogen cyanide from a gas mixture comprising ammonia and carbon dioxide which consists in treating the gas mixture with salts of bases the carbonates of which are less soluble than the salts used, in the presence of water adding carbon dioxide in the case of its deficiency until it is present in not less than stoichiometric proportions with respect to the ammonia.

7. In a process of manufacturing hydrogen cyanide the separation of the hydrogen cyanide from a gas mixture comprising ammonia and carbon dioxide which consists in treating the gas mixture with salts of bases the carbonates of which are less soluble than the salts used, in the presence of water adding more carbon dioxide than required to form ammonium carbonate with the ammonia present.

8. In a process of manufacturing hydrogen cyanide the separation of the hydrogen cyanide from a gas mixture comprising ammonia and carbon dioxide which consists in treating the gas mixture with salts of bases the carbonates of which are less soluble than the salts used, in the presence of water adding flue gases in the place of carbon dioxide.

9. In a process of manufacturing hydrogen cyanide the separation of the hydrogen cyanide from a gas mixture comprising ammonia and carbon dioxide which consists in treating the gas mixture with salts of bases the carbonates of which are less soluble than the salts used, in the presense of water, adding more carbon dioxide than required to form ammonium carbonate with the ammonia present, freeing the gaseous mixture from ammonia and converting the carbon dioxide into insoluble calcium carbonate.

10. In a process of manufacturing hydrogen cyanide the separation of the hydrogen cyanide from the gaseous mixture comprising ammonia and carbon dioxide, which consists in treating the gas mixture containing an excess of carbon dioxide over that required to form ammonium carbonate with the ammonia present, with an aqueous suspension of gypsum, causing the escaping gas mixture to react with alkali metal sulfate and lime in the presence of water and using the calcium sulfate thereby formed for the preparation of fresh suspensions for the absorption of ammonia and carbon dioxide from gaseous mixtures containing, in addition, hydrogen cyanide.

11. In a process of manufacturing hydrogen cyanide the separation of the hydrogen cyanide from the gaseous mixture comprising ammonia and carbon dioxide, which consists in treating the gas mixture with a suspension of gypsum in ammonium sulfate solution.

12. In a process of manufacturing hydrogen cyanide the separation of the hydrogen cyanide from the gaseous mixture comprising ammonia and carbon dioxide, which consists in treating the gas mixture having an excess of carbon dioxide over that required to form ammonium carbonate with the ammonia present, with a suspension of gypsum in ammonium sulfate solution, causing the escaping gas mixture to react with alkali metal sulfate and lime in the presence of water.

13. In a process of manufacturing hydrogen cyanide the separation of the hydrogen cyanide from the gaseous mixture comprising ammonia and carbon dioxide, which consists in treating the gas mixture having an excess of carbon dioxide over that required to form ammonium carbonate with the ammonia present, with a suspension of gypsum in ammonium sulfate solution, causing the escaping gas mixture to react with alkali metal sulfate and lime in the presence of water and using the calcium sulfate thereby formed for the preparation of fresh suspensions for the absorption of ammonia and carbon dioxide from gaseous mixtures containing, in addition, hydrogen cyanide.

14. In a process of manufacturing hydrogen cyanide the separation of the hydrogen cyanide from a gas mixture comprising ammonia and carbon dioxide which consists in treating the gas mixture with salts of bases, the carbonates of which are less soluble than the salts used, in the presence of water and recovering the ammonium content from the residues resulting from the absorption and containing calcium carbonate and ammonium sulfate, by heating.

Signed at Frankfort A/M., in the State of Prussia, Germany this 21st day of October A. D. 1924.

OTTO LIEBKNECHT.